United States Patent [19]

Sugahara et al.

[11] Patent Number: 5,689,307
[45] Date of Patent: Nov. 18, 1997

[54] ENCODING AND DECODING SYSTEMS FOR TRANSMITTING MOVING PICTURES

[75] Inventors: Takayuki Sugahara; Ichiro Ando, both of Yokosuka, Japan

[73] Assignee: Victor Company of Japan, Ltd., Tokyo, Japan

[21] Appl. No.: 544,471

[22] Filed: Oct. 18, 1995

Related U.S. Application Data

[63] Continuation of Ser. No. 88,762, Jul. 8, 1993, abandoned.

[30] Foreign Application Priority Data

Jul. 10, 1992 [JP] Japan .................................. 4-207430

[51] Int. Cl.$^6$ .................................................. H04N 17/18
[52] U.S. Cl. ........................ 348/419; 348/419; 348/416; 348/405
[58] Field of Search ........................ 348/419, 415, 348/416, 405, 700, 411, 423, 424, 466, 461, 420

[56] References Cited

U.S. PATENT DOCUMENTS

| | | | |
|---|---|---|---|
| 4,893,123 | 1/1990 | Boisson | 348/416 |
| 4,985,766 | 1/1991 | Morrison et al. | 348/416 |
| 5,038,209 | 8/1991 | Hang | 348/419 |
| 5,121,205 | 6/1992 | Ng et al. | 348/416 |
| 5,144,425 | 9/1992 | Joseph | 348/419 |
| 5,159,447 | 10/1992 | Haskell et al. | 348/419 |
| 5,164,828 | 11/1992 | Tahara et al. | 348/419 |
| 5,191,436 | 3/1993 | Yonemistu | 348/419 |
| 5,196,933 | 3/1993 | Henot | 348/419 |
| 5,241,401 | 8/1993 | Fujiwara et al. | 348/411 |
| 5,253,054 | 10/1993 | Fujiwara et al. | 358/133 |
| 5,283,646 | 2/1994 | Bruder | 348/415 |
| 5,440,345 | 8/1995 | Shimoda | 348/419 |
| 5,452,103 | 9/1995 | Brusewitz | 348/390 |
| 5,455,629 | 10/1995 | Sun et al. | 348/415 |

OTHER PUBLICATIONS

ISO/IEC CD 11172-2 1993 (E) 2-11172 rev 1 "Coding of Moving Pictures and Associated Audio for Digital Storage Media at up to about 1.5 Mbit/s".

*Primary Examiner*—Amelia Au
*Assistant Examiner*—Anand Rao
*Attorney, Agent, or Firm*—Michael N. Meller

[57] ABSTRACT

Moving picture coding system for coding a series of moving pictures including current and preceding pictures in an intra-picture and inter-picture prediction coding scheme, has a coding device for producing and transmitting coded data of moving pictures, a memory device for storing the coded data, and a detecting device for detecting excess from a predetermined transmission rate of the coded data to be transmitted. When the excess is detected, coded data of the current picture is skipped, but skip information is transmitted instead, and when the skipped current picture falls into a prediction reference picture for a subsequently coded picture, the preceding picture which is not skipped undergoes a prediction coding for transmission. In the decoding system for decoding the coded data, when the skip information is detected, one of non-skipped pictures adjacent to the current picture is outputted, and when the skipped picture falls into a prediction reference picture for a subsequently coded picture at a timing of coding, the preceding picture is used for prediction decoding in the decoding system.

4 Claims, 6 Drawing Sheets

Fig.4

ENCODING AND DECODING SYSTEMS FOR TRANSMITTING MOVING PICTURES

This application is a continuation of application Ser. No. 08/088,762, filed Jul. 8, 1993 and now abandoned.

BACKGROUND OF THE INVENTION

1. Field of the Invention

The present invention relates to encoding and decoding systems for transmitting and receiving moving pictures, and more particularly to an improved encoding and decoding system which compresses a moving picture signal for transmission of such as television signals.

2. Description of the Prior Art

Figure 1:
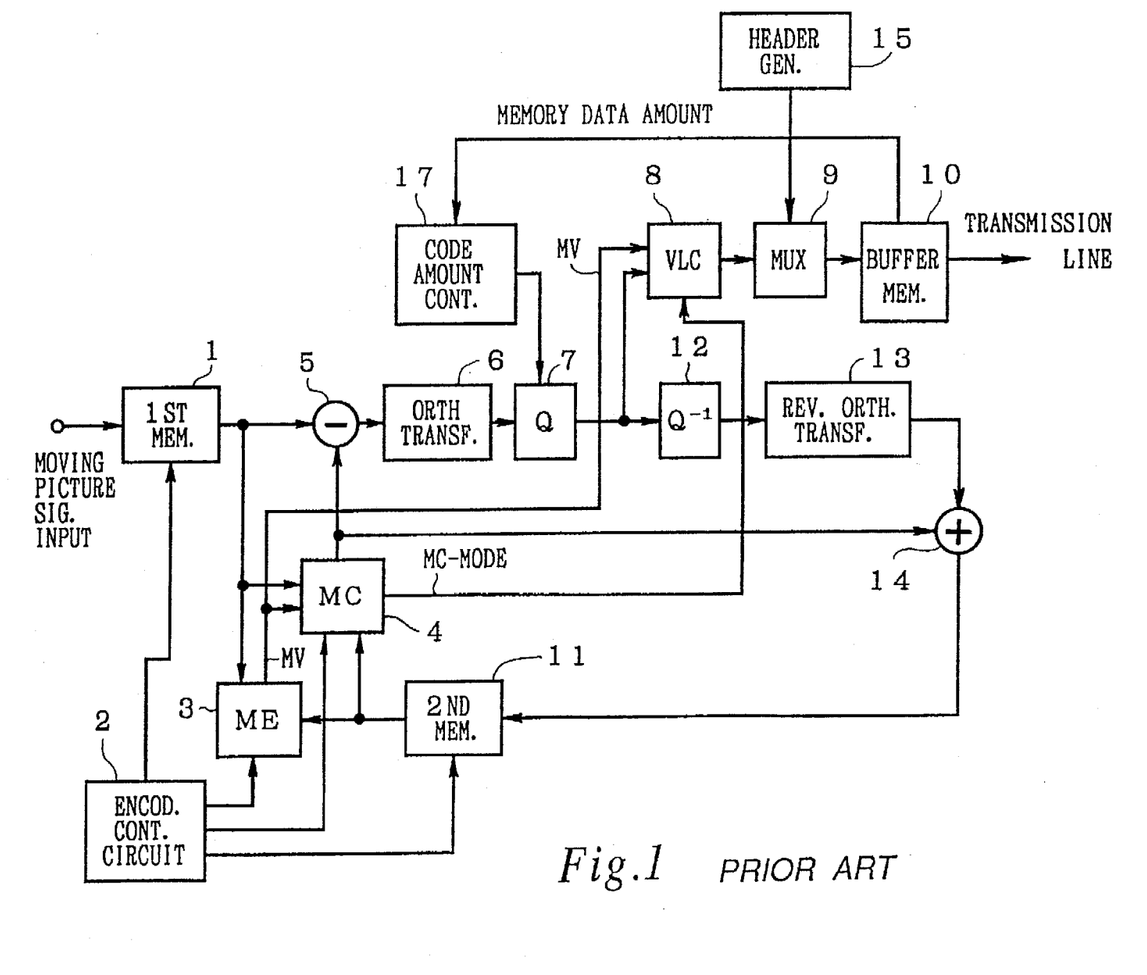
FIG. 1 shows a block diagram of conventional moving picture coding system.

FIG. 1 shows a moving picture coding system of prior art. In FIG. 1, a moving picture signal to be encoded is stored in a first memory 1 at every "prediction block", a block of picture element to be processed for motion-compensation, under a control of encoding control circuit 2, on the other hand, a reference picture (decoded picture) which is derived from a frame or a field immediately preceding or succeeding a current frame or field of moving picture signal, is stored in a second memory 11. A motion vector estimating circuit (ME) 3 estimates a motion vector MV with respect to the reference picture stored in the memory 11, and a motion-compensation predicting circuit (MC) 4 generates for every prediction block, motion-compensated prediction values (hereinafter referred to as "prediction values")by using the motion vector MV and the reference picture stored in the memory 11, and outputs motion-compensation prediction mode information "MC-mode".

The generated "prediction value" is deducted from the moving picture data stored in the first memory 1 by a subtractor 5 to produce a prediction error, which in turn undergoes an orthogonal transformation in an orthogonal transformation circuit 6, orthogonally transformed coefficients thus produced from the orthogonal transformation circuit 6 are then quantized by a quantizer (Q) 7. Resultant quantized values, the "MC-mode" information from the MC 4 and the motion vector MV estimated by the ME 3 are inputted to and coded in variable run length by a variable run length coding circuit (VLC) 8. Resultant coded data and header information generated from a header generator 15 are multiplexed by a multiplexer (MUX) 9. The multiplexed coded data outputted from the MUX 9 are tentatively stored in a buffer memory 10 in order to adjust the generated code rate to a transmission rate of the data to be read out and transmitted into a transmission line from the buffer memory 10.

Quantized data outputted from the quantizer 7 are converted back to original orthogonally transformed coefficients by a dequantizer ($Q^{-1}$) 12, then to an original decoded values of the prediction error by a reverse orthogonal transformation circuit 13. These prediction error values and the "prediction values" from the MC 4 are added each other by an adder 14, a resultant decoded picture is stored in the second memory 11.

There is a possibility of overflow in the buffer memory 10 when pictures to be coded are fast moving pictures or details within a picture are moving where the generated code rate exceeds the transmission rate for the transmission line. In order to prevent the overflow, a code amount controller 17 controls the quantizer 7 to make its quantization size coatset depending on a data amount in the buffer memory 10.

As a motion-compensation prediction coding system, there are 2 known systems, one of which is called the "unidirectional prediction coding" or simply "predictive picture" symbolized as "P" which utilizes a preceding picture of few frames or fields such as decoded picture stored in the second memory 11, another is called the "bidirectional prediction coding" or "bidirectional interpolated picture" symbolized as "B". In the latter system, the smallest prediction error value is selected in every prediction block, among 2 prediction errors and their mean value, of which 2 prediction errors are prediction errors of the prediction blocks of immediately preceding and succeeding decoded pictures with respective to a current picture to be processed. In this regard, the aforementioned "MC-mode" indicates which one of the above 3 errors is selected and coded. Accordingly in the latter coding system, coding of the current picture starts after completion of the immediately succeeding picture coding in time domain, these systems are adopted together with a system in which predictions are not performed but coding is implemented independently within a single picture called "independent or intra-picture coding" symbolized as "I".

In the actual moving pictures to be processed in a prediction-coding, so called "scene change" often takes place which develops a large amount of error at such changes. Generally in conventional systems, coding is controlled so as to output the data at a predetermined transmission rate allowing some degree of variation of data amount within a predetermined buffer capacity. However, at such "scene change" points, the control fails to limit the generated data amount to the predetermined transmission rate causing an overflow of the buffer memory capacity. One of the countermeasures to overcome the problem is detecting such scene changes and controls accordingly the quantization steps to a coarse quantization. By doing this, the system is kept under control within the predetermined transmission rate, but a quality degradation of the transmitted pictures develops partly and is visibly prominent.

SUMMARY OF THE INVENTION

Accordingly, it is a general object of the present invention to provide an improved moving picture encoding and/or decoding systems, in which aforementioned problems have been overcome.

Another and specific object of the present invention is to provide a high efficiency moving picture encoding system utilizing a coding scheme of an intra-picture coding and an inter-picture prediction coding, which system comprises a coding device, a memory device for storing coded data coded by the coding device and a detecting device for determining excess from a predetermined transmission rate when the coded data stored in the memory device are processed to be transmitted, when the excess is detected, the coded data are controlled not transmitted, so that a corresponding picture is skipped from presentation and instead, a skip information is transmitted. When the skipped picture is a prediction reference picture for a subsequently coded picture, a prediction coding is performed on the picture which is not skipped and past picture, in time domain, in the inputting order to the picture coding device.

Still another and specific object of the present invention is to provide a moving picture decoding system for decoding transmitted moving picture data subjected to a high efficiency coding by utilizing an intra-picture coding and an inter-picture prediction coding. The decoding system comprises a memory device for storing the transmitted coded moving picture data, a decoding device and a detecting device for detecting a skip information, when the skip information is transmitted, the system outputs, in place of the skipped picture, a non-skipped picture which is closest, in time, to the skipped picture, and in case that the skipped picture is a prediction reference picture, the non-skipped picture which is a past picture in time domain in the inputting order to the picture coding device, is used for a prediction coding.

According to the improved moving picture encoding and/or decoding systems of the present invention, an excess of the predetermined transmission rate is prevented since a skip code of short code length indicating a "skip" and its display timing, is transmitted instead of coded data of a picture when it causes a sudden increase of prediction error due to such as scene changes. Further, by skipping such a picture from transmission, a code amount in the buffer memory decreases in the period of the skipped picture which would otherwise be transmitted, this allows to assign a sufficient code length to an immediately following picture, thus degradation of picture quality is also avoided. In other words, the system of the present invention can handle, without picture quality degradation, scene changes which cause a sudden increase of prediction errors by shifting a picture presentation timing until the code amount in the buffer memory is decreased when the code amount can not allow its transmission. And when a picture to be skipped, occurs to become a prediction reference picture, the prediction coding is performed on a non-skipped "past" picture (preceding to a "current" picture to be processed) in terms of picture input order at an input terminal of the coding system.

Other objects and further features of the present invention will be apparent from the following detailed description with respect to the preferred embodiments of the invention when read in conjunction with accompanying drawings.

DETAILED DESCRIPTION OF THE PREFERRED EMBODIMENTS

Encoding and decoding systems for transmitting moving pictures according to the present invention will be described in detail with reference to the accompanying drawings in which same reference numerals and symbols are used to denote like or equivalent elements used in the aforementioned prior arts, and detailed explanation of such elements are omitted for simplicity.

Moving Picture Coding System

Figure 2:
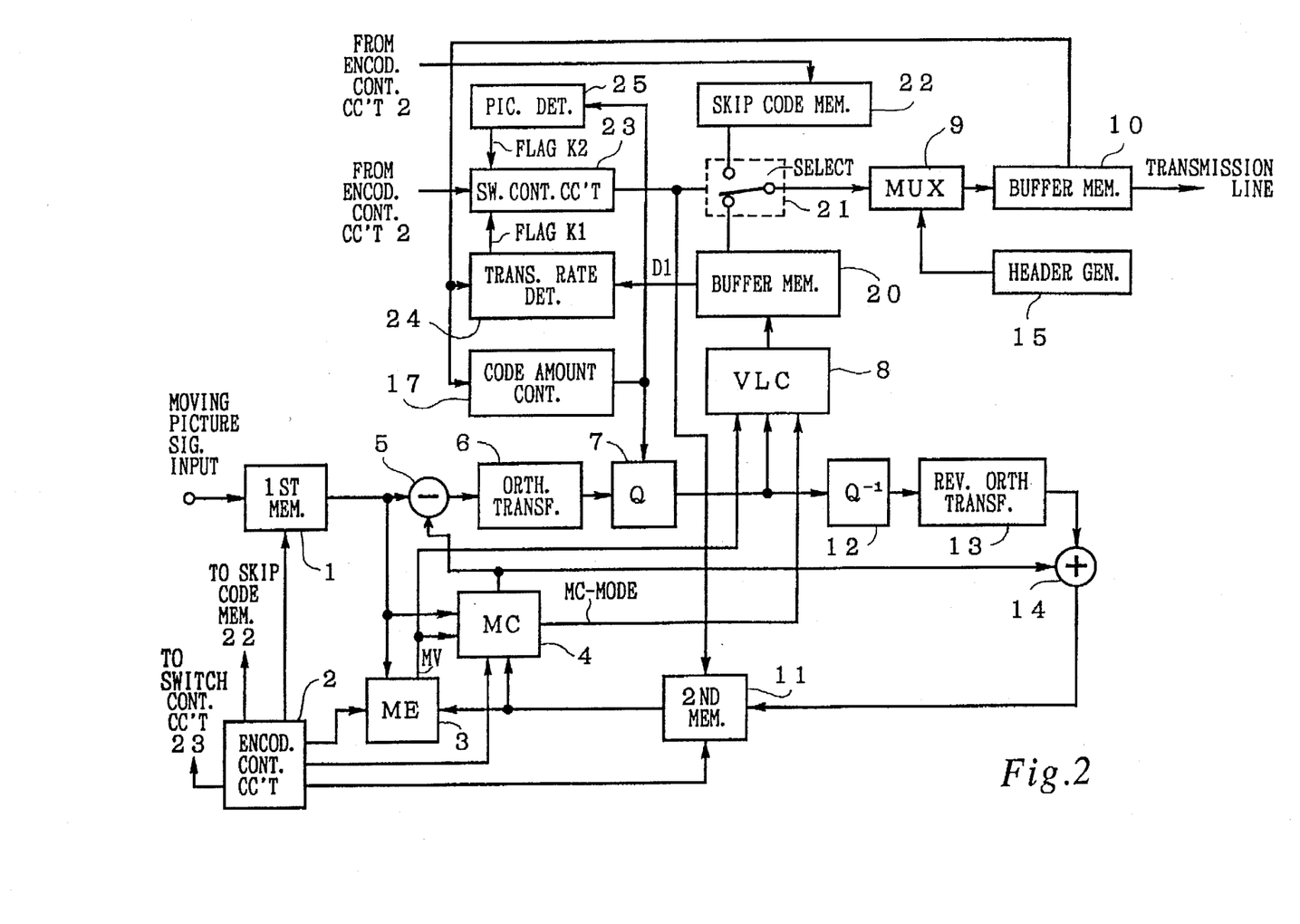
FIG. 2 shows a block diagram of moving picture coding system according to an embodiment of the present invention.

FIG. 2 shows a block diagram of moving picture coding system according to an embodiment of the present invention.

In FIG. 2, like in the prior art system explained referring to FIG. 1, a moving picture signal to be coded is stored in a first memory 1 at every "prediction block" under a control of encoding control unit 2, and, a reference picture derived from a frame or a field immediately preceding or succeeding a current frame or field of moving picture signal, is stored in a second memory 11. A motion vector estimating circuit (ME) 3 detects a motion vector MV with respect to the reference picture stored in the second memory 11, and a motion-compensation predicting circuit (MC)4 generates for every prediction block, prediction values by using the motion vector MV and the reference picture, and outputs motion-compensation prediction mode information "MC-mode".

The above prediction values are deducted from the moving picture data stored in the first memory 1 by a subtractor 5 to produce a prediction error, the produced prediction error values are transformed to be orthogonally transformed coefficients by an orthogonal transformation circuit 6, which are in turn quantized by a quantizer(Q) 7. Resultant value of quantized orthogonally transformed coefficients, the MC-mode information and the motion vector MV are inputted to and coded in variable run length by a variable run length coding circuit(VLC) 8.

Coded data equivalent to one picture by the VLC 8 in variable run length, are tentatively stored in a buffer memory 20, from which the coded data are selectively read out through a selector 21 and supplied to a multiplexer(MUX)9. The selector 21 is controlled by a switching control circuit 23.

Figure 3:
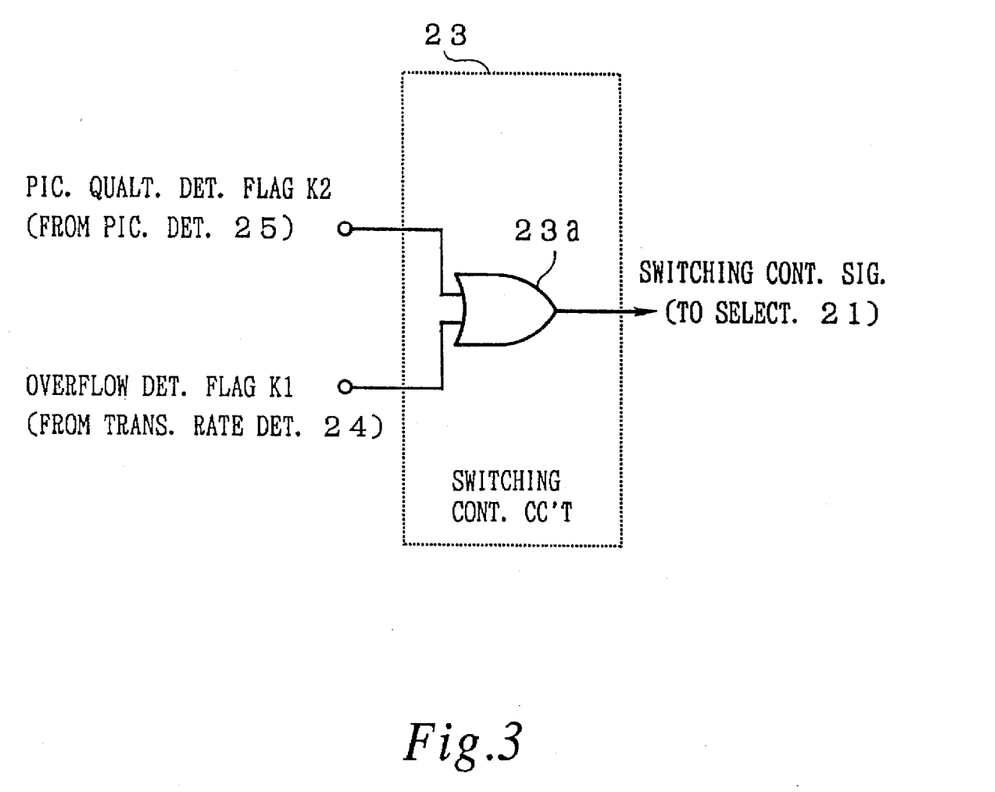
FIG. 3 shows a detail of switching circuit used in the embodiment shown in FIG. 2.

FIG. 3 shows a detail of switching control circuit 23 used in the embodiment shown in FIG. 2. The coded data stored in the buffer memory 20 or skip code data stored in a skip code memory 22 to be explained later, are selected and supplied to the MUX 9 in which the coded data are multiplexed together with header information generated by a header generator 15. The header includes a display timing code for indicating a display timing, and in the skip code memory a skip code (skip information) is stored. The multiplexed data outputted from the MUX 9 are tentatively stored in a buffer memory 10 provided for changing the generated data rate to a transmission rate of transmission line on to which the coded data in the buffer memory 10 provided for output, are read out.

The data quantized by the quantizer 7 are converted back to an original orthogonally transformed coefficients by a de-quantizer (Q−1) 12 then to decoded values of original prediction error by a reverse orthogonal transformation circuit. Resultant prediction error values and prediction values calculated by the MC 4 are added each other by an adder 14, a decoded picture obtained accordingly, is stored in the second memory 11.

When pictures to be coded are quick moving pictures or details of picture are changing, it is possible that a large amount of prediction error is generated which causes an overflow of the buffer memory 10 provided for output because of a fact that the rate of the generated code exceeds the predetermined transmission rate. As explained for the prior art, quantization steps of the quantizer 7 are regulated by a code amount control circuit 17 in response to a data amount in the buffer memory 10 to prevent such overflow.

Further in this embodiment, when a total data amount of the coded data amount D1 in the buffer memory 20 and an amount of the header information supplied from the header generator 15, is stored in the buffer memory 10 for transmission, using the data amount stored in the buffer memory 10 and the coded data amount D1 corresponding to one picture stored in the buffer memory 20, a transmission rate detecting circuit 24 detects possible excess from a predetermined value of the transmission rate of the total data amount to be transmitted, and outputs a detected result (flag K1) to the switching control circuit 23.

Observing a quantization control value applied from the code amount control circuit 17 to the quantizer 7, a picture quality determination circuit 25 determines whether a picture quality degrades at a decoding side, and outputs a determined result(flag K2) to the switching control circuit 23. Exemplary determination method of the picture quality is that a maximum value of the quantization control value in one picture is compared to a predetermined value, where quantization steps become coarse, it is determined that picture quality degradation will occur at the decoding side.

Next, a detailed structure of the switching control circuit 23 is explained referring to FIG. 3. A logical sum of the flag K1 and the flag K2 is taken by an OR gate 23a, an output of which is then fed to the selector 21 as a switching control signal, where K1 is 1 when the excess develops at the buffer memory 10, otherwise 0, K2 is 1 when the picture quality degradation is determined, otherwise 0. The selector 21 is controlled to output the skip code stored in the skip code memory 22 in response to the switching control signal as such that when the switching control signal is 1(true), the skip code stored in the skip code memory 22 is selectively outputted through the selector 21. The output of the OR gate 23a is supplied as well to the second memory 11 as a rewriting stop signal.

Accordingly, a picture is skipped from presentation, i.e. not displayed, when the skip code is selected in case of either the excess of the buffer memory 10 or the prospective occurrence of the picture quality degradation at the decoding side. As a result, a poor quality picture is omitted from its transmission. This prevents the overflow of the buffer memory 10 and allows an extra code amount(code amount which would otherwise be transmitted minus a skip code amount) to become available for a subsequent picture, thus the picture quality degradation at the decoding side is prevented. Prediction coding process where such skipped picture is a candidate for a prediction reference picture, will be explained later.

Moving Picture Decoding System

Figure 4:
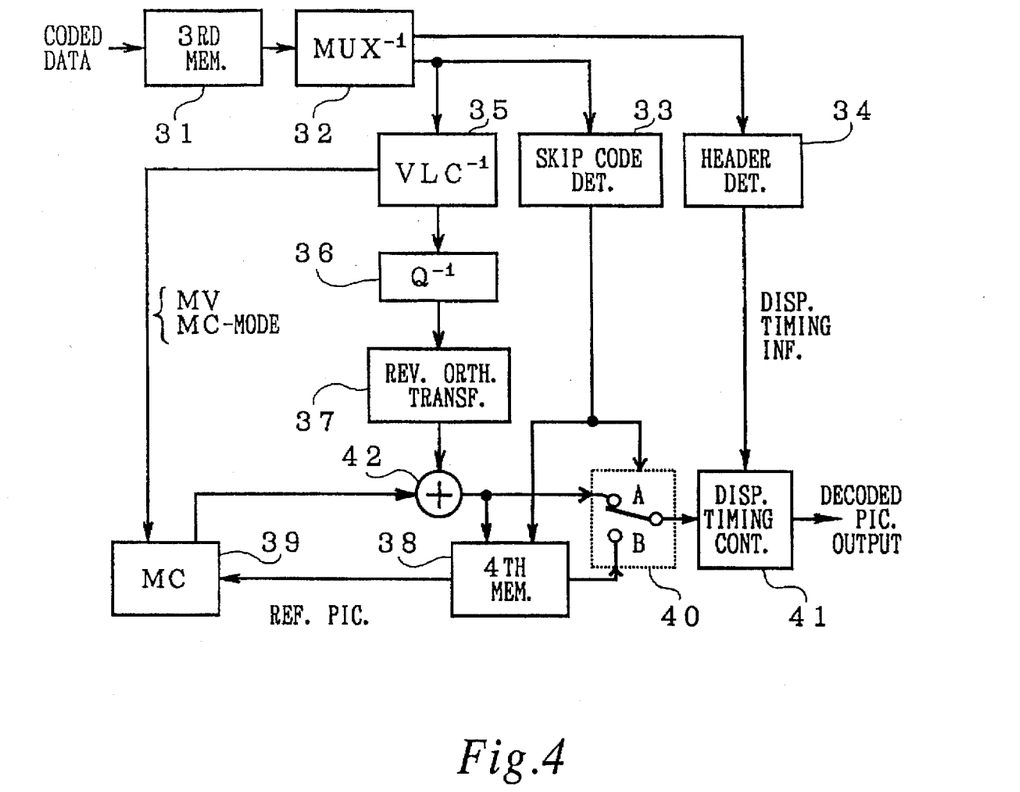
FIG. 4 shows a block diagram of moving picture decoding system according to an embodiment of the present invention.

FIG. 4 shows a block diagram of moving picture decoding system according to an embodiment of the present invention.

In FIG. 4, coded data(bit stream) received through the transmission line are supplied to a demultiplexer(MUX$^{-1}$) 32 after tentatively stored in a third memory 31. The header information is separated from other information in the demultiplexer 32 and is forwarded to a header detector 34, and the other information is forwarded to a variable run length decoding circuit(VLC$^{-1}$) 35 and to a skip code detector 33 which turns a selector 40 to its "B" side upon detection of a skip code, otherwise the selector 40 is kept to its "A" side. Output of the skip code detector 33 is supplied as well to a fourth memory 38 as a rewriting stop signal. The header detector 34 detects a picture presentation(display) timing and forwards its information to a display timing controller 41.

Motion vector MV and the MC-mode (motion-compensation prediction mode information) outputted from the VLC$^{-1}$ 35 are supplied to a motion compensation circuit(MC) 39, and the picture data(orthogonally transformed coefficients) outputted from the VLC$^{-1}$ 35 are supplied to a reverse orthogonal transformation circuit 37 after undergoing a dequantization by a dequantizer 36. The picture data are subjected to a reverse orthogonal transformation by the reverse orthogonal transformation circuit 37 so as to be a prediction error decoded signal(decoded picture signal in the "I" frame).

Using the motion vector MV and the MC-mod, a prediction reference picture obtained from the fourth memory 38, is motion-compensated in the MC 39, and is added with the prediction error decoded signal by an adder 42 to become a decoded picture signal which is in turn forwarded to the fourth memory 38 and to the display timing controller 41 through a "B" contact of the selector 40. When a skip code is detected by the skip code detector 33, the fourth memory 38 and the selector 40 are so controlled respectively that the former stops its rewriting (updating) and a decoded picture signal in the fourth memory 38 is forwarded to the display timing controller 41 through the contact "B" of the selector 40, from which the the decoded picture signal is outputted according to the display timing information supplied from the header detector 34. Accordingly, when skip code is transmitted from the encoder, a non-skipped reference picture which is closest to the skipped picture is outputted to display.

Method for Prediction Coding and Decoding

Using aforementioned coding and decoding systems utilizing a skip code, output pictures of frame by frame advancing are obtained. Overall quality of the finally reproduced pictures depends on the prediction scheme of the coding system and on which one of the past pictures in the input order to the coding system, is used. Further in the coding and decoding systems, the non-skipped reference picture which is closest to the skipped picture is outputted to display when a skipped picture falls into a candidate position for a prediction reference picture, therefore, problems such as loss of prediction reference picture in the prediction decoding do not develop.

As described before, there are three representative types of motion-compensation prediction coding systems as enumerated below:

I: coding is performed independently within a single picture without prediction

P: coding with unidirectional prediction (past picture is used as a prediction reference picture)

B: coding with bidirectional prediction (one or both of the past[preceding] and the future[succeeding] pictures is used as a prediction reference picture)

(A) Unidirectional Prediction

FIG. 5 is for explaining a unidirectional picture process involving a skip. FIG. 5 illustrates a basic prediction scheme using "I" and "P" pictures only. Solid arrows indicate a predicting relationship(direction) for instance, P4(picture 4) connected to P3(picture 3) with an arrow, is coded by being predicted from P4. Dotted arrow indicates a replacement picture used upon skipping. Number after "P" denotes a presentation timing. FIG. 5(A) shows an input sequence to a coding device without a skip, FIG. 5(B) shows an output sequence from the coding device i.e. the input sequence to a decoding system, FIG. 5(C) shows an output sequence from the decoding system without a skip, FIG. 5(D) shows an output sequence from the coding device when one picture (P4) is skipped and FIG. 5(E) shows output pictures from the decoding system when the skip (P4) occurs.

Figure 5A:
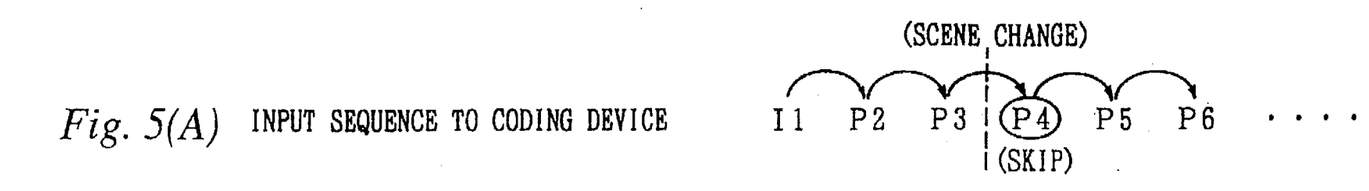
FIG. 5 is for explaining a unidirectional picture process involving a skip.
Figure 5B:
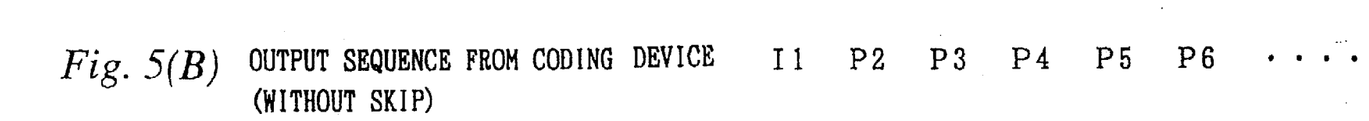
Figure 5C:
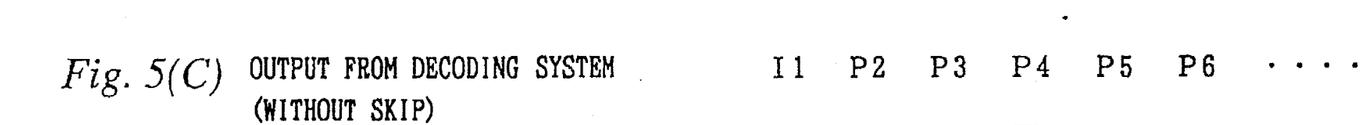
Figure 5D:
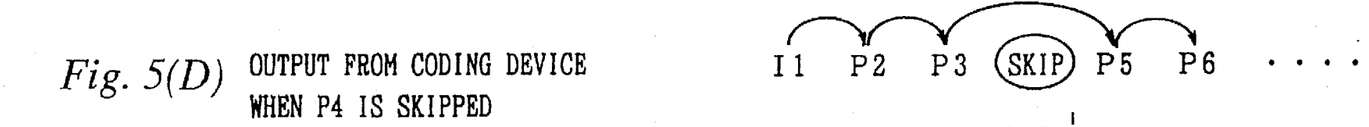
Figure 5E:
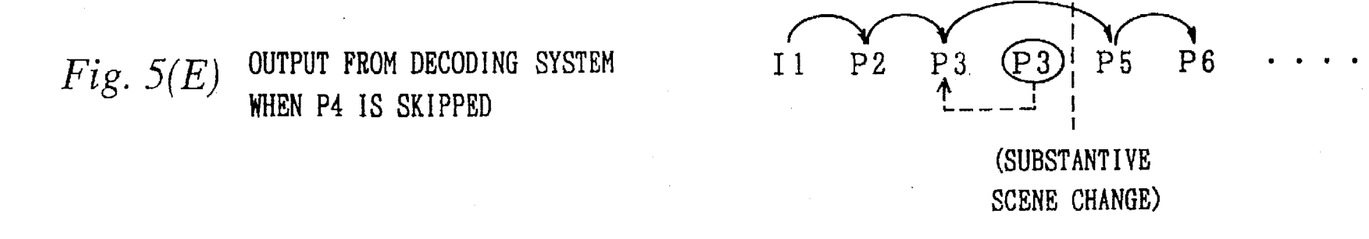

In FIG. 5(A) and (D), when a scene change occurs between P3 and P4, picture P4 as indicated by the broken vertical line in FIG. 5(a) is skipped as shown in FIG. 5(D) according to the process as described before, which reduces the transmission data amount, causing a reduction of data amount in a buffer memory provided for coded signal output and allowing subsequent P5 being transmitted in high quality. And as shown in FIG. 5(E), P3 is duplicated to output at the timing of P4 in the final output of the decoding system. Further, P3 is used for predicting P5 as the skipped P4 was originally at the position of the prediction reference picture for P5, where P3 is the non-skipped past (in time domain) picture in the input order to the coding device.

By doing the above processing, compared to P4 which is a coarsely quantized picture, and to P5 which is predicted from the coarsely quantized picture P4, both of the P3 which replaced the skipped P4 and the P5 which is predicted from P3, can be in high quality, thus the overall picture presentation(display) can be high quality. In this method, even when a scene change occurs which generates a large amount of prediction errors and the output buffer memory cannot handle the increased code amount, the timing of substantive scene change is shifted, as indicated by the broken line in FIG. 5(E) until the code amount in the output buffer memory decreases, so that the system handles the scene change without picture degradation.

(B) Bidirectional Prediction

FIG. 6 is for explaining a bidirectional picture process involving a skip.

Figure 6A:
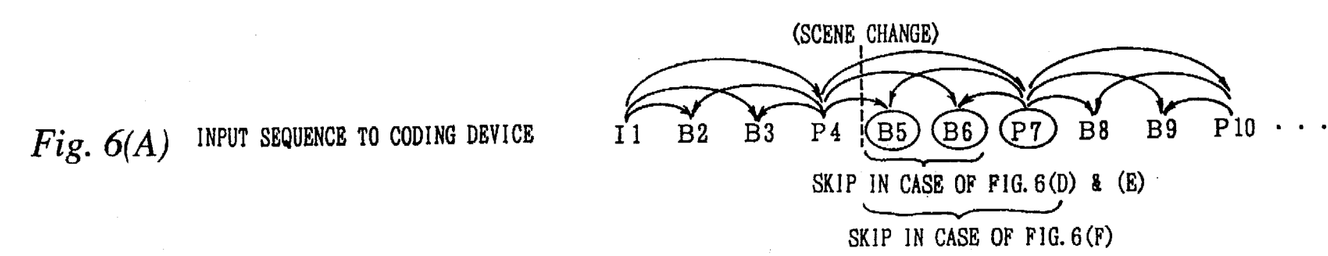
FIG. 6 is for explaining a bidirectional picture process involving a skip.
Figures 6B, 6C:
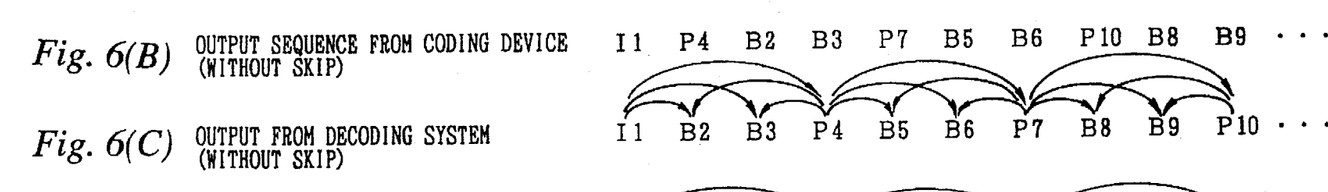
Figure 6D:
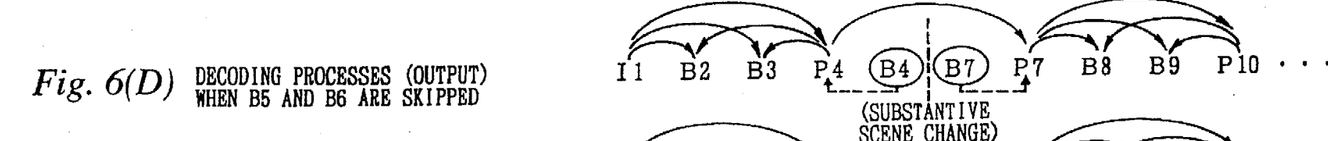
Figure 6E:
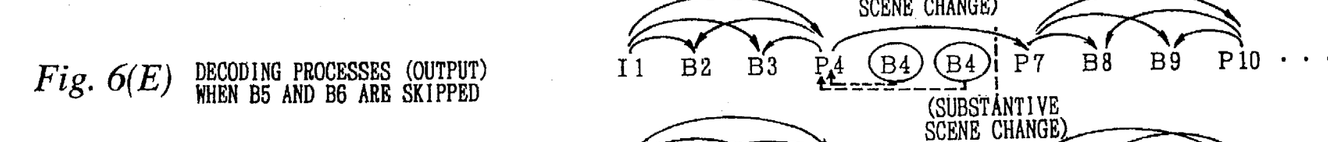
Figure 6F:
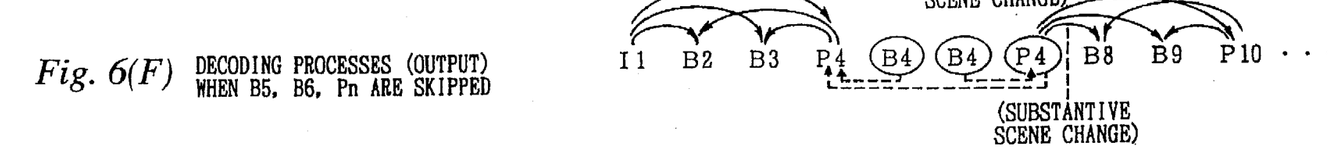

FIG. 6(A) shows an input sequence to a coding device, FIG. 6(B) shows an output sequence from the coding device without a skip, FIG. 6(C) shows an output sequence from the decoding system without a skip. FIGS. 6(D) and FIG. 6(E) show decoding processes when pictures B5 and B6 are skipped. FIG. 6(F) shows decoding processes when pictures B5, B6 and $P_n$ are skipped.

Bidirectional prediction scheme utilizing pictures of 'I', "P" and "B" is shown in FIG. 6, where a scene change occurs between P4 and B5 as shown by the broken vertical line in FIG. 6(A). FIGS. 6(D) and 6(E) show an example of skipping B5 and B6 of FIG. 6(A). Since B-pictures can be predicted from either or both sides(fore and aft) respectively it is necessary to predetermine which one or both of the past and future pictures is used as a prediction reference picture for the 2 B-pictures when skipping occurs.

If P-pictures which are close to the skipped pictures, are used as prediction reference pictures, the prediction decoding is performed as shown in FIG. 6(D), where a picture duplication takes place at timings of B5 and B6, i.e. P4 is displayed again at the timing of B5 (circled B4) and P7 is displayed again at the timing of B6 (circled B7). Thus the substansive scene change takes place between the circled B4 and the circled B7 as indicated by the broken vertical line.

If a past P-picture is used as the prediction reference picture for the 2 B-pictures, the prediction decoding is performed as shown in FIG. 6(E), where 3 identical pictures are outputted, i.e. P4 is presented as well as at the timings of B5 and B6 (2 circled B4). Thus the substantive scene takes place before P7 as indicated by the broken vertical line.

FIG. 6(F) shows an example of skipping B5, B6 and P7 of FIG. 6(A). When P7 is skipped, the prediction decoding is performed as such that a non-skipped past picture in the input order to the coding device is used as the prediction reference picture, i.e. P4 is used as the prediction reference picture at the timing of P7. As a result, B5 and B6 predicted respectively from P4 and P7 [see FIG. 6(A)] become P4 in either case of referring a picture of past or future, consequently, 4 identical pictures i.e. P4 is outputted as well as at the timings of B5, B6 and B7 (2 circled B4 and 1 circled P4). Thereafter a substantive scene change takes place as indicated by the broken vertical line. Since the processing is performed as above, compared to B5, B6 and P7 (coarsely quantized picture) all coded in limited code amount explained for the prior art, high quality pictures are obtained for the reason explained in the paragraph (A).

Accordingly in the present invention, when the prediction error suddenly increases due to such as scene changes, the picture which is responsible to the increase, is skipped and only a skip code indicating a "skip" and the display timing of the coded data, is transmitted where the code amount of the skip code is smaller than the that of the skipped picture which would otherwise be outputted to the transmission line so that the excess(overflow) of transmission rate is prevented. And, by skipping the picture upon a sudden increase of the prediction error due to such as scene changes, an immediately following picture can be assigned with sufficient code amount as the content of the output buffer memory decreases during a transmission period of one skipped picture, this gives finer quantization steps to the immediately following picture, thus a possible picture quality degradation is prevented. Further, in case that the skipped picture is a prediction reference picture for the subsequently coded picture, the non-skipped picture which is a past picture in time domain in the inputting order to the picture coding device, is used for a prediction coding, so that no prediction decoding problem develops.

Consequently, the present invention provides practical encoding and decoding systems for transmitting moving pictures having quick scene changes, in which high efficiency codings are performed without causing prediction decoding problems and overflows between the coding and decoding systems when moving pictures to be transmitted undergo inter-picture and intra-picture codings.

What is claimed is:

1. Moving picture coding system for coding a series of moving pictures including current and preceding pictures using a scheme of inter-picture prediction coding, said current picture being preceded by the preceding picture, said moving picture coding system comprising;

coding means for producing coded data of said moving pictures by said inter-picture prediction coding;

first memory means for storing said coded data;

skip code memory means for holding a skip code indicating skip of said moving pictures from transmission;

switching means connected to said first memory means, for selectively outputting one of said coded data stored in said first memory means and said skip code in response to a switching control signal such that when said coded data is skipped from transmission, said skip code is selected to be outputted therefrom for transmission in place of said coded data which is skipped;

second memory means connected to said switching means for buffering at skip-subjected coded data outputted from said switching means and for transmitting said skip-subjected coded data with said skip code into a transmission line;

switching control signal generating means responsive to said coded data and skip-subjected coded data for generating said switching control signal so as to preliminary prevent an excess of transmission rate of said coded data from a predetermined value before being transmitted into said transmission line; and control means responsive to said switching control signal for controlling said coding means so that said preceding picture not being skipped becomes a prediction reference picture instead of said current picture.

2. Moving picture coding and decoding system for coding and decoding a series of moving pictures including current and preceding pictures using a scheme of inter-picture prediction coding, said current picture being preceded by the preceding picture, said moving picture coding and decoding system comprising:

coding means for producing coded data of said moving pictures by said inter-picture prediction coding;

first memory means for storing said coded data;

skip code memory means for holding a skip code indicating a skip of said moving pictures from transmission;

switching means connected to said first memory means, for selectively outputting one of said coded data stored in said first memory means and said skip code in response to a switching control signal as such that when said coded data is skipped from transmission, said skip code is selected to be outputted therefrom for transmission in place of said coded data which is skip;

second memory means connected to said switching means for buffering a skip-subjected coded data outputted from said switching means and for transmitting said skip-subjected coded data with said skip code into a transmission line;

switching control signal generating means responsive to said coded data and skip-subjected coded data for generating said switching control signal so as to preliminary prevent an excess of transmission rate of said coded data from a predetermined value before being transmitted into said transmission line;

control means responsive to said switching control signal for controlling said coding means so that said preceding picture not being skipped become a prediction reference picture instead of said current picture;

third memory means for storing said skip-subjected coded data transmitted through said transmission line;

decoding means for decoding said skip-subjected coded data stored in said third memory means and outputting a series of pictures for display; and skip code detecting means for detecting said skip code contained in said skip-subjected coded data transmitted through said transmission line; whereby when said skip code is detected by said skip code detecting means, said decoding means outputting one of adjacent pictures which are standing immediately adjacent to said current picture at a time of coding, said one of adjacent pictures not being skipped from transmission, and when said current picture which is skipped from transmission falls into a prediction reference picture for a subsequently coded picture by said coding means, said decoding means uses coded data of said preceding picture for prediction decoding.

3. Moving picture coding system for coding a series of moving pictures including current and preceding pictures using a scheme of inter-picture prediction coding, said current picture being preceded by the preceding picture, said moving picture coding system comprising;

coding means for producing coded data of said moving pictures by said interpicture prediction coding;

first memory means for storing said coded data;

skip code memory means for holding a skip code indicating a skip of said moving pictures from transmission;

switching means for selectively outputting one of said coded data and said skip code instead of said coded data in response to a switching control signal so that skip-subjected coded data are outputted therefrom;

second memory means connected to said switching means for buffering said skip-subjected coded data outputted from said switching means and for transmitting said skip-subjected coded data with said skip code into a transmission line;

switching control signal generating means responsive to said coded data and skip-subjected coded data for generating said switching control signal so as to preliminary prevent an excess of transmission rate of said coded data from a predetermined value before being transmitted into said transmission line; and control means for controlling an operation of said coding means responsive to said switching control signal; whereby when said current picture is a prediction reference picture and is skipped for transmission, said control means causes said coding means to perform inter-picture prediction coding on said preceding picture which is not skipped for transmission, so that said preceding picture not skipped is transmitted instead of said current picture.

4. Moving picture coding and decoding system for coding and decoding a series of moving pictures including current and preceding pictures using a scheme of inter-picture prediction coding, said current picture being preceded by the preceding picture, said moving picture coding and decoding system comprising:

coding means for producing coded data of said moving pictures by said inter-picture prediction coding;

first memory means for storing said coded data;

skip code memory means for holding a skip code indicating a skip of said moving pictures from transmission;

switching means for selectively outputting one of said coded data and said skip code instead of said coded data in response to a switching control signal so that skip-subjected coded data are outputted therefrom;

second memory means connected to said switching means for buffering said skip-subjected coded data outputted from said switching means and for transmitting said skip-subjected coded data with said skip code into a transmission line;

switching control signal generating means responsive to said coded data and skip-subjected coded data for generating said switching control signal so as to preliminary prevent an excess of transmission rate of said coded data from a predetermined value before being transmitted into said transmission line;

control means for controlling an operation of said coding means responsive to said switching control signal, whereby when said current picture is a prediction reference picture and is skipped for transmission, said control means causes said coding means to perform inter-picture prediction coding on said preceding picture which is not skipped for transmission, so that said preceding picture not skipped is transmitted instead of said current picture;

third memory means for storing said skip-subjected coded data transmitted through said transmission line;

decoding means for decoding said skip-subjected coded data stored in said third memory means and outputting a series of pictures for display; and skip code detecting means for detecting said skip code contained in said skip-subjected coded data transmitted through said transmission line; whereby when said skip code is detected by said skip code detecting means, said decoding means outputting one of adjacent pictures which are standing immediately adjacent to said current picture at a time of coding, said one of adjacent pictures being not skipped from transmission, and when said current picture which is skipped from transmission falls into said prediction reference picture for a subsequently coded picture by said coding means, said decoding means uses coded data of said preceding picture for prediction decoding.

* * * * *